Feb. 27, 1962     E. K. WILLIAMS     3,023,345
THREE PHASE PROTECTIVE RELAY SYSTEM RESPONSIVE
TO AMPLITUDE OF RIPPLE VOLTAGE
Filed Nov. 30, 1959
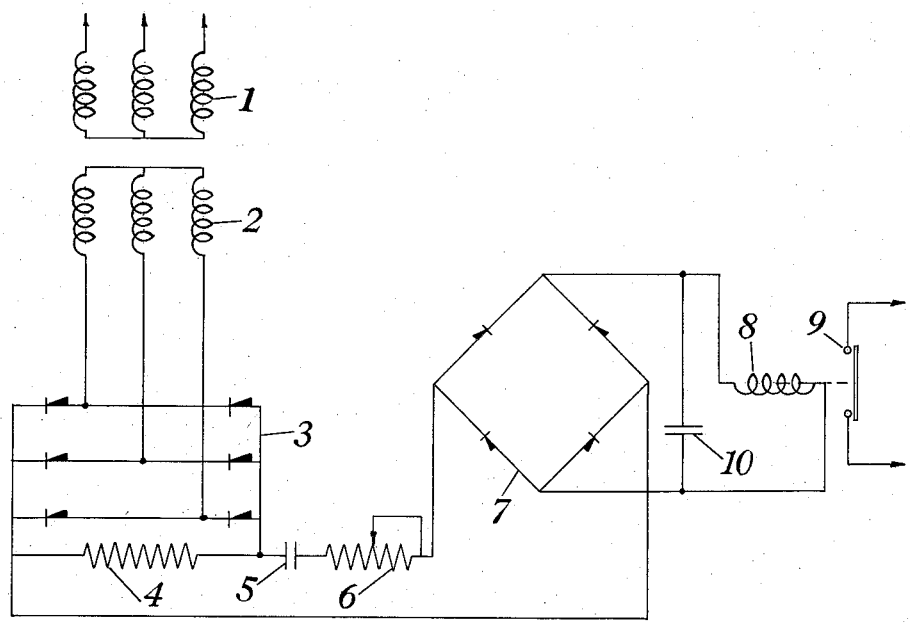
Inventor
E. K. Williams
By: Glascock Downing & Seebold
Attys.

United States Patent Office 3,023,345
Patented Feb. 27, 1962

3,023,345
THREE PHASE PROTECTIVE RELAY SYSTEM RESPONSIVE TO AMPLITUDE OF RIPPLE VOLTAGE
Edward Kenneth Williams, Pinner, England, assignor to Rotax Limited, London, England
Filed Nov. 30, 1959, Ser. No. 856,159
Claims priority, application Great Britain Dec. 1, 1958
2 Claims. (Cl. 317—52)

The object of this invention is to provide convenient means for protecting a three phase electric system against line to line, line to neutral faults, or a fault in which one line is on open circuit.

Means according to the invention comprises a resistance connected through a full wave rectifier to the secondary windings of a transformer the primary windings of which are connected to the three phases of the system to be protected, a capacitor connected in parallel with said resistance and in series with a second rectifier, and a relay the operating coil of which is connected across the second rectifier, the arrangement being such that under normal conditions the relay is ineffective, but in the event of a line to line fault, a line to neutral fault in the system, or one of the lines being on open circuit the relay will be energised to initiate a control of the system and/or a warning.

An example of the invention will now be described with reference to the accompanying wiring diagram.

The three phases of the system to be protected are connected to the primary windings 1 of a step-down transformer. The secondary windings 2 of this transformer are connected to a full wave rectifier 3 across the output terminals of which is connected a resistance 4.

In parallel with the resistance 4 is a circuit including a blocking capacitor 5, a variable resistance 6 and a bridge-type rectifier 7 connected in series, whilst across the rectifier 7 is connected the operating coil 8 of a relay having its contact 9 in a control and/or warning circuit. Desirably, a second and smoothing capacitor 10 is also connected across the rectifier 7 in parallel with the relay.

Under normal conditions the three-phase system creates in the resistance 4 a ripple voltage of small amplitude and having a frequency six times that of the fundamental frequency of the system, and the operating coil 8 of the relay is prevented from being energised due to the effect of the blocking capacitor 5 which prevents the flow through the rectifier 7 of direct current from the rectifier 3. However, in the event of a line to line, or line to neutral fault in the system, or a fault in which one line is on open circuit the amplitude of the ripple voltage in the resistance 4 will be increased.

Under the latter condition the capacitor 5 will permit a current to pass which is sufficient to energise the operating coil 8 of the relay and thereby effect a control of the three-phase system and/or actuate a warning signal, the quantity of such current being determined by the adjustment of the variable resistance 6.

Having thus described my invention what I claim as new and desire to secure by Letters Patent is:

1. Means for protecting a three-phase electric system, comprising in combination with the system, a transformer having three primary windings and three secondary windings, said primary windings being respectively connected to the three phases of said system, a first full wave rectifier connected to said secondary windings and provided with a pair of output terminals, a resistance connected across said output terminals so that said system, when in action, normally creates a ripple voltage of small amplitude in said resistance, a second rectifier connected in parallel with said resistance, a blocking capacitor connected in series with said second rectifier for normally preventing the flow through the latter of direct current from said first full wave rectifier, and a protective relay having an operating coil which is connected across said second rectifier, and which is prevented from being energised under normal conditions due to the effect of said blocking capacitor, but which is energised for operating said relay in the event of the amplitude of the ripple voltage in said resistance being increased as a result of a fault in said system.

2. Means according to claim 1 and having a variable resistance in series with said capacitor and second rectifier.

References Cited in the file of this patent
UNITED STATES PATENTS

| | | |
|---|---|---|
| 2,256,347 | Mode | Sept. 16, 1941 |
| 2,384,375 | Hayward | Sept. 4, 1945 |
| 2,474,290 | Terry | June 28, 1949 |
| 2,830,193 | Kinney | Apr. 8, 1958 |

OTHER REFERENCES

| | | |
|---|---|---|
| 1,040,117 | Germany | Oct. 2, 1958 |